Sept. 26, 1950 A. CHEVALLIER 2,523,813

BACKUP PROTECTION FOR COMPARATOR SYSTEMS HAVING FAULTED SUPPLY

Original Filed April 5, 1945 5 Sheets-Sheet 1

INVENTOR
ANDRE CHEVALLIER
BY Lucke + Lucke
AGENTS

INVENTOR
ANDRE CHEVALLIER
BY Lucke + Lucke
AGENTS

INVENTOR
ANDRE CHEVALLIER
BY Lucke + Lucke
AGENTS

INVENTOR
ANDRE CHEVALLIER
BY Lucke + Lucke
AGENTS

INVENTOR
ANDRE CHEVALLIER
BY Lucke & Lucke
AGENTS

Patented Sept. 26, 1950 2,523,813

UNITED STATES PATENT OFFICE 2,523,813

BACKUP PROTECTION FOR COMPARATOR SYSTEMS HAVING FAULTED SUPPLY

André Chevallier, Paris, France, assignor to Societe Union D'Electricite, Paris (Seine), France, a society of France Original application April 5, 1945, Serial No. 586,778. Divided and this application October 25, 1947, Serial No. 782,195. In France September 10, 1943

13 Claims. (Cl. 175—294)

The present invention relates to methods and apparatus for measuring or comparing periodic, and in particular sinusoidal functions or factors, of the kind described in my prior U. S. patent application Ser. No. 586,778, filed April 5, 1945, for "Improvements in Device for Measuring and Comparing Functions" of which the present application is a division.

Such an apparatus essentially includes comparators supplied with the sinusoidal factors in question.

The chief object of the present invention is to provide an apparatus of the kind in question which is capable of working correctly even when for some reason one of the factors to be compared cannot be transmitted to the corresponding comparator device (for instance in the case of a dead line or of a failure in the transmission between comparator devices).

Preferred embodiments of the present invention will be hereinafter described with reference to the accompanying drawings, given merely by way of example, and in which:

Fig. 1 is a diagram showing the arrangement of the protection apparatus in several sections of a line;

Fig. 2 diagrammatically shows a discriminative protection system according to the invention;

Figure 12:
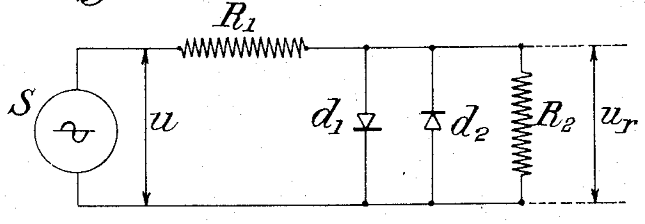
Figure 13:
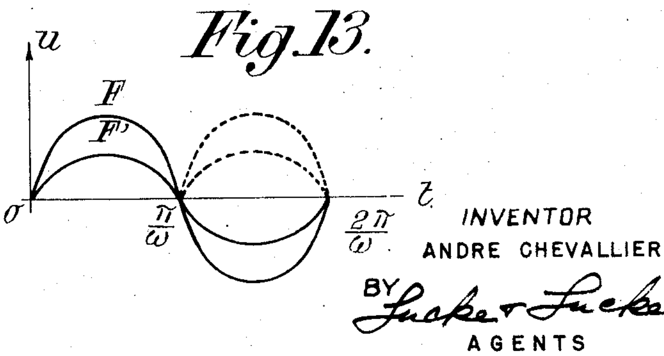

Fig. 12 diagrammatically shows a voltage limiting device to be included in such a system, this device being made according to the invention;

Fig. 13 is a diagram of the voltage on the input and output sides of this limiting device.

In the following description, it will be supposed that the invention is applied to the protection of an energy transmission network.

Figure 1:
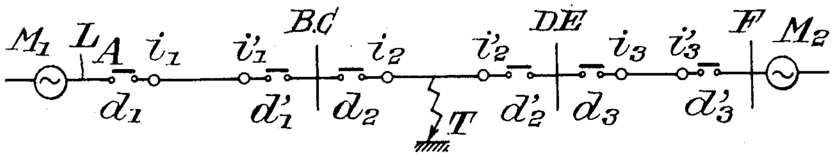

Fig. 1 diagrammatically shows, by way of example, a line L supposed to be fed at both ends by groups of machines $M_1$ $M_2$. Several sections are illustrated at AB, CD, EF, with their circuit-breakers $d_1$, $d'_1$, $d_2$, $d'_2$, $d_3$, $d'_3$, etc.

If a fault occurs, for instance, at T, in section CD, the currents $i_1$, $i'_1$ in section AB remain in phase, same as the currents $i_3$, $i'_3$ in section EF, while the currents $i_2$, $i'_2$ in the section CD where the fault has occurred are reversed with respect to each other.

The method described in the above mentioned application provides for comparators at the extremities of each section, to detect this reversal and control the release of the corresponding circuit-breakers.

Figure 2:
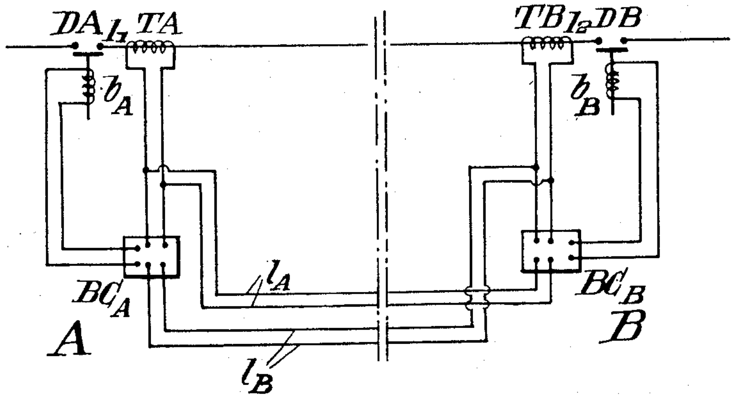

Fig. 2 diagrammatically shows the equipment for one line section AB, with circuit-breakers DA—DB. The comparators are illustrated at $BC_A$ and $BC_B$; they are both acted upon by the currents $I_1$ and $I_2$ or by the powers at the respective ends of the section, for instance through intensity transformers TA and TB, or by voltages $u_1$ and $u_2$ proportional to these currents or powers and in phase therewith. For instance, each comparator has two inputs, one directly connected to the transformer (TA or TB) located at the same end of the section as this comparator and the other connected (through distance transmission means, such as lines $l_B$ or $l_A$) with the transformer (TB or TA) at the other end of the section. Comparator device $BC_A$ is adapted to act upon the coil $b_A$ of circuit-breaker DA, and comparator device $BC_B$ upon the coil $b_B$ of circuit breaker DB.

Figure 3:
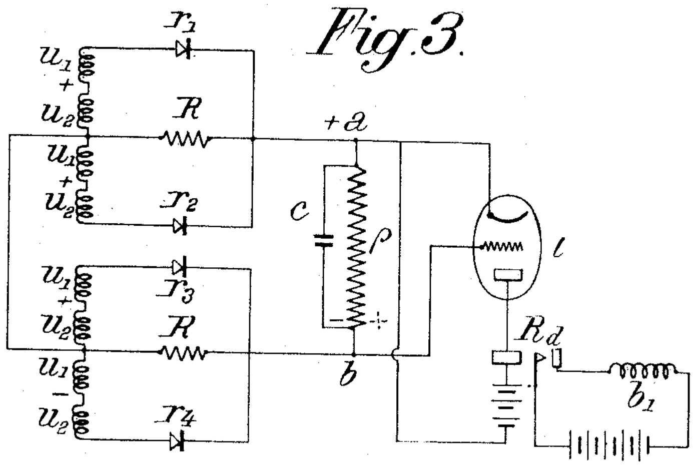
Fig. 3 is a diagram of one of the comparator devices included in this system.

Fig. 3 shows a comparator device of the dry rectifier type such as those described in the above mentioned prior application.

It comprises two circuits (each preferably double in order to rectify both alternations) in one of which the alternating potentials $u_1$ and $u_2$ are added together (upper circuit on the diagram of Fig. 3), whilst they are subtracted from one another in the other (lower circuit). To this end, it suffices to make use of transformer devices, of which only the secondaries have been shown on Fig. 3, it being understood that the primary circuits are arranged in any suitable manner such in particular as described in the above mentioned prior application. The rectifiers are shown at $r_1$, $r_2$, $r_3$, $r_4$.

Each of the circuits includes a resistance R and the whole of said two resistances R is connected in series with a resistance $\rho$ so that there is finally obtained, between two points $a$ and $b$, a potential difference in one direction or the other according as potentials $u_1$, $u_2$ are in phase or not.

It is then possible to operate a relay R$d$ mounted to control the corresponding circuit-breaker, for example by using the potential difference between $a$ and $b$ to polarize one or more electronic tubes (multi-electrode valves, thyratrons, etc.) arranged in such manner as to operate the said relay.

In the embodiment of Fig. 3 the circuit-breaker is combined with a relay R$d$ controlling the circuit of the coil $b_1$ of breaker DA. Tube $l$ is inserted in the circuit of the winding of said relay R$d$ and has its grid and filament connected to points $a$ and $b$, respectively. In normal working conditions, that is to say when potentials $u_1$ and $u_2$ are in phase, point $a$ is positive with respect to point $b$, so that no current flows through valve $l$ (relay R$d$ is therefore inactive). As soon as a fault takes place, the reversal resulting therefrom in one of the potentials $u_1$ and $u_2$ causes a reversal of the current between $a$ and $b$ so that point $a$ becomes negative with respect to point $b$, relay $R_d$ is brought into play and the corresponding circuit-breaker is tripped open.

A capacitor C may be provided across the terminals of $\rho$ to permit of giving the time constant the minimum value and thus ensuring the maximum speed of operation. I may also, in order to diminish the time constant, dispose the trip coil $b_1$ (Fig. 8) directly in the circuit of the valve or of the thyratron.

Figure 8:
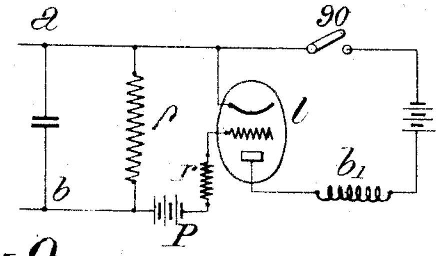
Fig. 8 is a view of a portion of the same device made according to another embodiment.

In Fig. 8 which shows an embodiment in which a thyratron is used, P designates the grid polarisation battery, provided with a resistance $r$. A switch is provided at 90 in the anode circuit for cutting the current therethrough after release of the circuit-breaker, said switch being for instance operative by said circuit-breaker.

I will now explain the operation of the rectifiers of Figures 3 and 8.

Figure 4:
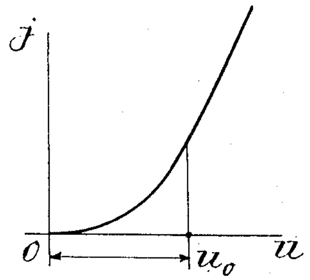
Fig. 4 shows the current-voltage curve of a contact rectifier, this curve being given to illustrate the working of rectifiers such as shown by Fig. 3.

It is known that the current-potential curve of these rectifiers is of parabolic form at the origin (Fig. 4) then becoming progressively straight; for values of the potential $u$ greater than a lower limit $u_0$, it may be considered as rectilinear.

It has been shown in the above mentioned prior application that, in the parabolic portion, the mean rectified current passing through resistances $\rho_1$, $\rho_2$ (Fig. 3) is of the form:

$$i=4ku_1u_2$$

If $u_1$ and $u_2$ are themselves of the form of:

$$u_1=U_1 \cos \omega t$$

$$u_2=U_2(\cos \omega t-\varphi)$$

current $i_m$ is:

$$i_m=4kU_1U_2 \cos \varphi$$

that is to say, proportional to the phase difference between currents $I_1$ and $I_2$. Which shows that, as above stated, a defect occurring on the line and causing the reversal of one of the currents $I_1$, $I_2$ (one of these currents being thus in phase difference of $\pi$) has for effect also to reverse the mean current in said resistances:

$$i'_m=-4kU_1U_2 \cos \varphi$$

It has been found, according to my invention, that the same reversal is obtained with the device working along the straight portion of the characteristic.

This results from the fact that the mean current $j_m$ flowing through resistances $\rho_1$ and $\rho_2$ is then:

$$j_m=\frac{2}{\pi}\left[\sqrt{U_1^2+U_2^2+2U_1U_2 \cos \varphi}-\sqrt{U_1^2+U_2^2-2U_1U_2 \cos \varphi}\right]$$

This is a periodic function of a period equal to $2\pi$. Therefore if $\varphi$ is changed to $\pi+\varphi$, $j_m$ becomes $-j_m$.

Figure 5:
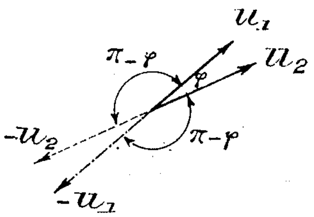
Fig. 5 is a diagram given for the same purpose.

Thus whether the system is working along the parabolic portion or the straight portion of the characteristic curve, the same operation takes place: to wit, the reversal of the mean current in response to the reversal of only one of the potentials $u_1u_2$. It is to be furthermore noted that if the two potentials are reversed (Fig. 5) the angle between these two potentials remain $\varphi$ so that the direction of the mean current is not modified.

It should also be pointed out that the more or less complex form of potentials $u_1$ $u_2$ is without influence on the result, since the development in Fourier series of the function representing the rectified current shows that the only terms remaining after this rectification, apart from the constant terms (mean value $i_m$) are even terms in $2\omega t$, $4\omega t$, etc., the mean value of which from 0 to $\pi$ is zero.

It has been supposed, in the preceding description, that two voltages $u_1$ and $u_2$ were permanently available at the terminals of the comparator devices such as $BC_1$ or $BC_2$. But is may happen that one of these terms does not exist or is not transmitted. This is the case, in particular:

(a) When the line A—B, C—D, E—F is fed with current only from one end thereof; or (b) When there is a breakdown in the transmission $l_B$ between the comparator devices.

In both of these cases, the comparison cannot take place, since the direct current supplied by the comparator devices is zero and indicates no potential difference between points $a$ and $b$.

According to my invention, means are provided for obviating this drawback, said means being adapted, even in the above mentioned cases, to supply the comparator, in the occurrence of a fault on the line, with two input voltages in opposition, which trip the circuit-breakers.

Although it is possible, for someone skilled in the art, to provide various means of this kind, it has been found that it suffices, according to a very simple embodiment, to provide at each end of the line and on each phase, a voltage having a phase difference of $$\frac{\pi}{2}$$

with respect to the voltage of this phase.

This is due to the fact that, if a fault occurs one the line, the current I is caused to lag by practically $$\frac{\pi}{2}$$

behind the star grouping voltage of the phase concerned with this fault. Now, this current I ($I_1$ or $I_2$, Figs. 2 and 6, at the section ends where the comparator devices $BC_1$ or $BC_2$ are mounted) remains always applied to the comparator device that is considered, so that the latter receives a voltage $u_1$ or $u_2$ that lags by $$\frac{\pi}{2}$$

behind the star grouping voltage of this phase.

If, now, there is applied to the same comparator device an auxiliary voltage $u_a$ with a leading phase difference of $$\frac{\pi}{2}$$

this last mentioned voltage has a phase difference of $\pi$ with voltage $u_1$ or $u_2$. Therefore it causes release to take place.

Figure 6:
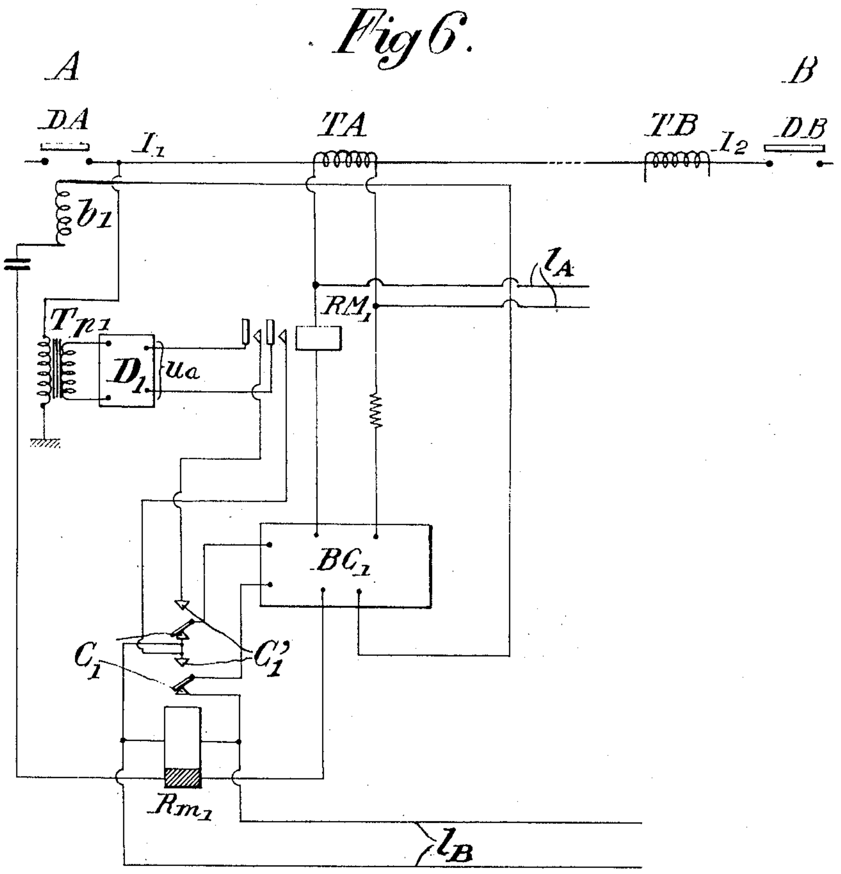
Fig. 6 shows a portion of a system of the kind illustrated by Fig. 2, made according to one of the features of the invention.

A diagram of a device for carrying out this principle is shown by Fig. 6.

Comparator device $BC_1$ is arranged in the same manner as that of Fig. 2, but it is combined:

(a) On the one hand with a first relay $Rm_1$ located at the entrance of the transmission line $l_B$ and adapted, when no current is being fed through said line, (which applies as well to the case of the line being dead as to that of a breakdown in transmission $l_B$), to open contacts $C_1$, that is to say to isolate this transmission, and to close contacts $C'_1$ which connect the comparator device with a dephasing device $D_1$ which supplies the auxiliary voltage $u_a$ in phase difference of $$\frac{\pi}{2}$$

ahead of the star grouping voltage; and (b) On the other hand with a second relay $RM_1$, of the intensity maximum type, having its winding in series with transformer TA and its contacts interposed between device $D_1$ and contact $C'_1$, this relay being such that it establishes connection between said device $D_1$ and said contacts $C'_1$ only when intensity $I_1$, under the effect of a fault, exceeds a predetermined maximum value.

The various contacts are shown in Fig. 6 in their positions corresponding to normal operation, in the absence of a fault and when the line is live.

Every time the line is dead or there is a breakdown in transmission $l_B$, relay $Rm_1$ comes into the other position. When a fault occurs, the operation of relay $RM_1$ ensures the desired instantaneous tripping of the protection apparatus.

Figure 10:
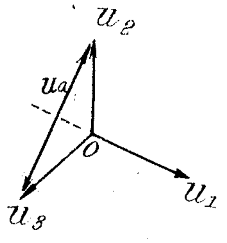
Fig. 10 is an explanatory diagram relating to the system of Fig. 11.

But auxiliary voltage $u_a$ may be obtained in a different manner. For instance, I may take advantage of the fact, illustrated by Fig. 10, that, in the case of a three-phase system the voltages in the three phases of which are shown at $u_1$, $u_2$, $u_3$, a dephased voltage such as that above designated by $u_a$ is obtained with respect to the voltage of one phase $u_1$ by taking the voltage between the two other phases $u_2$ and $u_3$.

Figure 11:
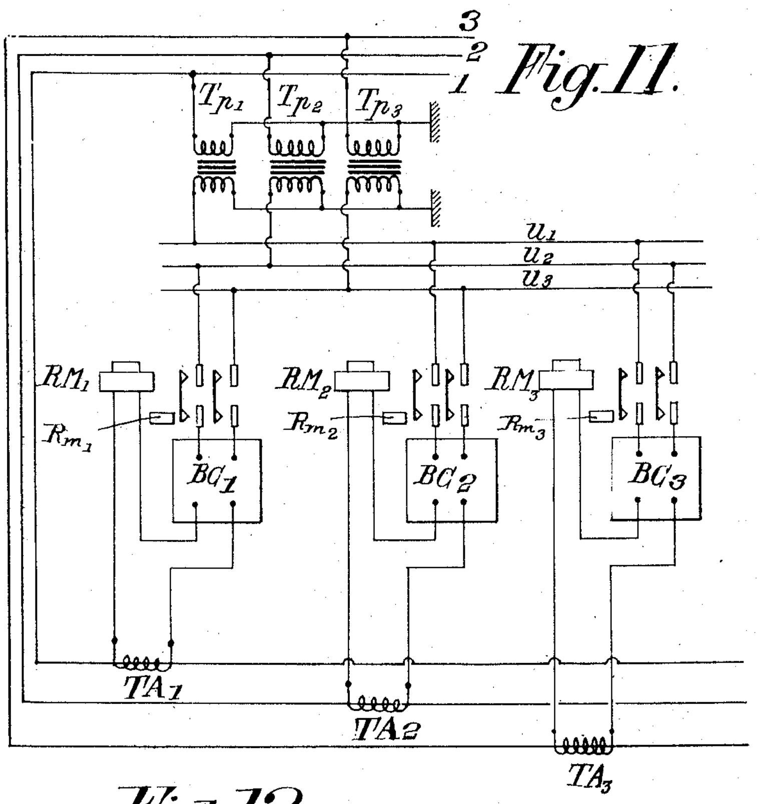
Fig. 11 shows a portion of the system of Fig. 7, according to a modification of the invention.

Fig. 11 shows an arrangement based on this principle. This figure is intended to show only the connections for supplying the compensator devices $BC_1$, $BC_2$, $BC_3$ with the desired auxiliary voltages $u_{a1}$, $u_{a2}$, $u_{a3}$. The connections for normal operation have not been shown on this figure, nor the circuits for controlling the circuit-breakers and the circuits for operating relays $R_{m1}$, $R_{m2}$, $R_{m3}$. Fig. 11 shows that a three-phase system of conductors, designated by the voltages $u_1$, $u_2$, $u_3$ existing therein, is connected to the line 1, 2, 3 through voltage transformers $T_{p1}$, $T_{p2}$, $T_{p3}$ so that voltages $u_1$, $u_2$, $u_3$ are of suitable values to be fed to the comparator devices $BC_1$, $BC_2$, $BC_3$.

The input of each of said comparator devices will be supplied, on the one hand, through transformers $TA_1$, $TA_2$, $TA_3$, as usual, and on the other hand, when one of the relays $T_{m1}$ $T_{m2}$, $T_{m3}$ are energized, with a voltage $u_a$ proportional to the difference between the two other phases. For instance relay $R_{m1}$ will connect the corresponding input terminals of $BC_1$ with conductors $u_2$ and $u_3$.

It should be noted that the comparator devices must be adjusted in such manner that they cannot cause tripping of the circuit-breakers when there is no voltage between points *a* and *b* of said comparator devices, especially in one of the two cases above mentioned, to wit dead line or breakdown in the transmission. For this purpose, it suffices, considering for instance the case of Fig. 3, suitably to bias the grid of tube *l* so that relay R*d* cannot be energized in the absence of a difference of potential between *a* and *b*.

Besides, it may be advantageous, according to still another feature of the invention, to provide indicator means for checking the operation of the apparatus.

Figure 9:
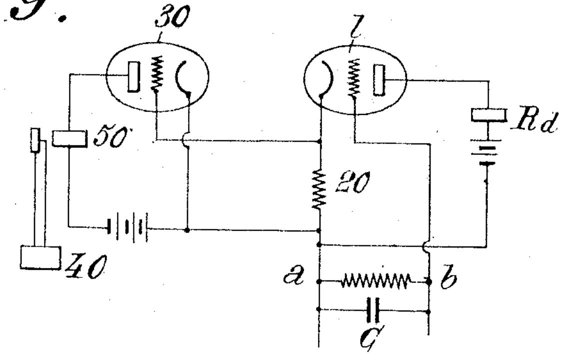
Fig. 9 shows the same portion of the comparator device, embodying other features of the invention.

Such means will for instance indicate, in a visual, acoustic, or other way, the absence of a potential difference between the terminals of resistance $\rho$, that is to say between points *a* and *b* of the comparator device of Fig. 3. According to an embodiment illustrated by Fig. 9, I provide in the circuit of tube *l* (see Fig. 3), a resistance 20 connected across the filament grid space of an auxiliary tube 30 adapted to control from a distance an alarm device 40 through a relay 50.

Under normal transmission conditions (*a* positive, *b* negative), tube *l* is conducting and there is a small current flowing through resistance 20. Therefore tube 30 is conducting and relay 50 is kept energized. This current through resistance 20 disappears when for some reason the comparator device ceases to work and there is no difference of potential between *a* and *b*. The voltage across tube 30 then drops to zero, relay 50 is de-energized and alarm is given by indicator 50.

The present invention also includes another feature, relating to the voltage limiting devices to be interposed on the input side of the comparator devices as indicated in the above mentioned prior application. If it is true that the quickness of tripping is proportional to the mean current rectified in the comparator devices, which current is a function of voltages $u_1$ and $u_2$, which themselves increase simultaneously with currents $I_1$ and $I_2$, it is however necessary to limit these voltages to suitable values. It is possible to make use for this purpose of limiting devices of any known type, provided that their time constants are as low as possible.

For instance, it will be advantageous to make use of a device of the kind of that of Fig. 12, in which, in order to obtain a reduced voltage $u_r$ from the voltage $u$, rectifiers such as $d_1$, $d_2$, are arranged in parallel.

Fig. 12 shows that the source S that supplies voltage $u$ feeds resistances $R_1$ and $R_2$ ($R_2$ representing the utilization resistance) with, in shunt, rectifiers $d_1$ and $d_2$ the current-voltage characteristic curve of which is parabolic. Therefore, the resistance of these rectifiers has a curve of hyperbolic shape, that is to say decreases simultaneously with the voltage at the terminals. Under these conditions, the drop of potential across resistance $R_1$ increases much more rapidly than the value of voltage $u$. Besides, it should be noted that this drop of potential is the greater as the value of the resistances of rectifiers $d_1$ and $d_2$ is smaller.

Finally, for the utilization voltage $u_r$, a curve is obtained of the shape of that shown at F' on Fig. 13 (where F represents the initial voltage $u$).

It should be noted that the flattened curve F′ that is thus obtained may be considered as the sum of sine curves the frequencies of which are $\omega t$, $2\omega t$, $3\omega t$, $4\omega t$, etc., but in which the rectifying effect has eliminated all odd numbered harmonics. Therefore, there remain only even-numbered harmonics which, as above stated, are without influence on the comparator device, since their mean value in a half-period is zero.

Finally, according to still another feature of the invention, dephasers may be provided for correcting the angle of phase difference that may result from transmission TR and also for taking into account the fact that the angle of phase difference between $I_1$ and $I_2$ is slightly smaller than $\pi$ when a fault occurs and tends to be more or less different therefrom according to the conditions of loading of the line at this time. The intensity of the mean current rectified in the comparator devices, upon which the quickness of the release depends, varies in fact in inverse ratio to the angle $\varphi$ between $I_1$ and $I_2$, so that it is particularly interesting to compensate for the phase difference that may be brought about for the above mentioned reasons.

The essential elements of a protection system according to the invention having thus been described, it seems of interest to give, by way of example, a general diagram in which these elements are explicitly shown.

Figure 7:
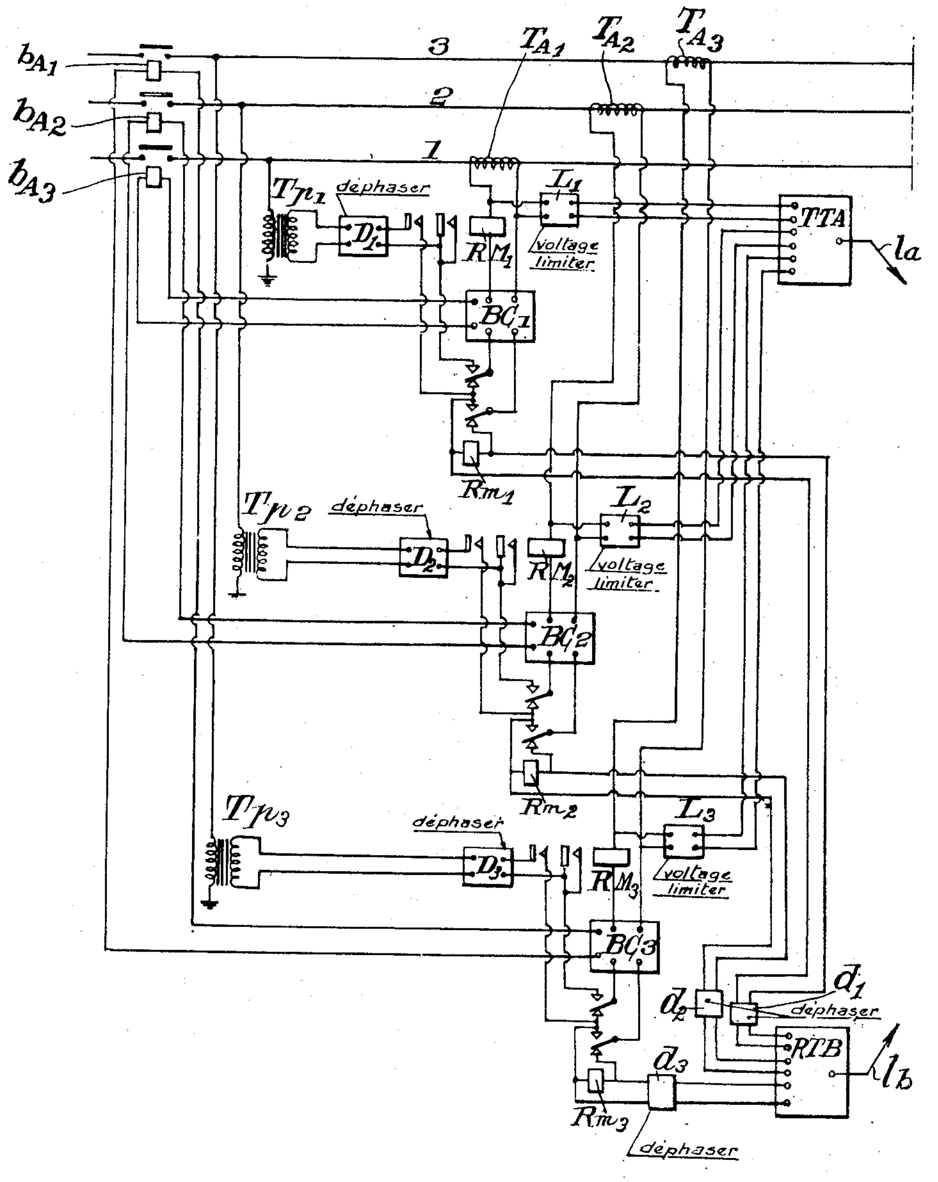
Fig. 7 is a detailed showing of a protection system made according to the invention.

In Fig. 7, which constitutes such a diagram, I have shown at:

$TA_1$, $TA_2$, $TA_3$, the intensity transformers intended to impress the voltages such as $u_1$, $u_2$, $u_3$ on the comparator devices;

$Tp_1$, $Tp_2$, $Tp_3$, the potential transformers for the feed of the dephasers $D_1$, $D_2$, $D_3$;

$b_{A1}$, $b_{A2}$, $b_{A3}$, the trip coils of the circuit-breakers;

$BC_1$, $BC_2$, $BC_3$, the comparator devices;

TR, the transmission between comparator devices;

RE, the receivers of this transmission;

$L_1$, $L_2$, $L_3$, the voltage limiting devices;

$RM_1$, $RM_2$, $RM_3$ the current maximum relays;

$D_1$, $D_2$, $D_3$, the dephasers that supply the auxiliary voltage $u_a$ having a phase difference of $$\frac{\pi}{2}$$

ahead of the corresponding star grouping voltages;

$Rm_1$, $Rm_2$, $Rm_3$, the relays which operate contacts CC′ and are intended to coact with RM, as above stated;

$d_1$, $d_2$, $d_3$, the dephasers for correcting the phase difference angle variations resulting from at least one of the above mentioned causes.

The transmission system may be of any suitable type. Transmission by means of carrier currents flowing through the network itself is well known. But other systems may be used. If, for instance, six lines such as $l_A$ and $l_B$ (Figs. 2 and 6) are available between the ends A and B of the section, bilateral transmission of the three above mentioned voltages is very simple since it can be performed in the 50 period system directly. If only a telephonic pair ($l_a$ $l_b$, Fig. 7) is available, it is possible to transmit voltages at different musical frequencies modulated by said voltages. Musical frequency transmitting and receiving sets TTA and RTB (Fig. 7) will be necessary at each section end.

Anyway, a protection system made as above described and as illustrated by the appended drawings complies with all the requirements of practice, as hereafter briefly set forth:

(*a*) If there is a fault inside a section, it is immediately detected by the reversing of the current direction between points *a* and *b* (Figs. 3 and 8), as above indicated. Operation is practically instantaneous as the time constant of the various circuits is extremely low;

(*b*) If there is a fault on the outside of the section that is being considered, the currents at the ends of this section are not reversed so that the potential difference between *a* and *b* remains in the same direction, that is to say negatively polarizes the grid of the control tube, the circuit breakers therefore remaining locked in their closed position. Besides, it should be noted that the grid polarization is the greater as the fault current is more considerable;

(*c*) The system works as above indicated, whatever be the nature of the fault (between one phase and the earth, between two phases, symmetrical between the three phases, or between the three phases and the earth);

(*d*) If synchronism is broken, the currents at the ends of the line sections are not reversed with respect to each other, the voltage between *a* and *b* remains positive and the release coil is not fed; on the other hand, if a fault occurs while the synchronism is being broken, the currents are reversed and the release order is transmitted;

(*e*) Protection is still ensured even in the case of the line being dead or in that of a lack of transmission between comparator devices, owing to the provision of the special means above described;

(*f*) The working of the devices remains correct even in case of lack of transmission since the absence of a difference of potential between points *a* and *b* does not result in the release of the protection apparatus taking place;

(*g*) Finally, owing to the supplementary checking means above described, it is possible to know at any time if the protection apparatus are in good working order.

The protection system according to the invention eliminates all measurement relays such as directional watt-metric relays, minimum impedance relays, and so on. The only relays that are made use of are relays of the telephonic type or of the current maximum type.

Furthermore, this protection system does not require the provision of a phase sorter when it is necessary or desired to perform automatic reengagement phase by phase.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In connection with an electric system traversed by at least one alternating current and divided into sections, the combination of a comparator device located at one end of a section of said electric system, means, including a coupling between said end of said section and said comparator device and distance transmission means between the other end of said section and said comparator device, for transmitting from the respective ends of said section to the input of said comparator device voltage values proportional to the factors to be compared, respectively, an apparatus coupled with said comparator device to be operated by it in response to a reversing in the phase relation between said respective factors, means, at said first mentioned end of said section, for supplying an auxiliary voltage in leading phase difference of 90° with the voltage at said end of said section, and means for connecting said auxiliary voltage supply means with said comparator device in response to the occurrence of a fault in said section during a period for which one of said voltage values is not transmitted to said comparator means.

2. In connection with an electric distribution system traversed by at least one alternating current and divided into sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection apparatus at one end of said section, means coupled with the output of said comparator device for operating said protection apparatus in response to a reversing in the phase relation between the simultaneous values of said voltages, means, at said first mentioned end of said section, for supplying an auxiliary voltage in leading phase difference of 90° with the voltage at said end of the section, and two relays in series for connecting said auxiliary voltage supply means with said comparator device, one of said relays being operative in response to a failure of said transmission means and the other in response to the occurrence of a fault in said section of said system.

3. In connection with an electric distribution system traversed by at least one alternating current and divided into sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection apparatus at one end of said section, means coupled with the output of said comparator device for operating said protection apparatus in response to a reversing in the phase relation between the simulaneous values of said voltages, means, constituted by a dephaser coupled with said electric system, at said first mentioned end of said section, for supplying an auxiliary voltage in leading phase difference of 90° with the voltage at said end of the section, and means for connecting said auxiliary voltage supply means with said comparator device in response to the occurrence of a fault in said section during a breakdown of said distance transmission means.

4. In connection with an electric distribution system traversed by at least one alternating current and divided in'o sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection apparatus at one end of said section, means coupled with the output of said comparator device for operating said protection apparatus in response to a reversing in the phase relation between the simultaneous values of said voltages, means, constituted by a dephaser coupled with said electric system, at said first mentioned end of said section, for supplying an auxiliary voltage in leading phase difference of 90° with the voltage at said end of the section, and two relays in series for connecting said auxiliary voltage supply means with said comparator device, one of said relays being operative in response to a failure of said transmission means and the other in response to the occurrence of a fault in said section of said system.

5. In connection with an electric distribution system traversed by at least one alternating current and divided into sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection circuit-breaker at one end of said section, means coupled with the output of said comparator device for releasing said circuit-breaker in response to a reversing in the phase relation between the simultaneous values of said voltages, means, at said first mentioned end of said section, for supplying an auxiliary voltage in leading phase difference of 90° with the voltage at said end of the section, means for connecting said auxiliary voltage supply means with said comparator device in response to the occurrence of a fault in said section during a breakdown of said distance transmission means, and means for opposing the release of said circuit-breaker in case of absence of voltage across the output terminals of said comparator device.

6. In connection with an electric distribution system traversed by at least one alternating current and divided into sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection circuit-breaker at one end of said section, means coupled with the output of said comparator device for releasing said circuit-breaker in response to a reversing in the phase relation between the simultaneous values of said voltages, means, at said first mentioned end of said section, for supplying an auxiliary voltage in leading phase difference of 90° with the voltage at said end of the section, two relays in series for connecting said auxiliary voltage supply means with said comparator device, one of said relays being operative in response to a failure of said transmission means and the other in response to the occurrence of a fault in said section of said system, and means for opposing the release of said circuit-breaker in case of absence of voltage across the output terminals of said comparator means.

7. In connection with an electric distribution system traversed by at least one alternating current and divided into sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection circuit-breaker at one end of said section, a relay for releasing said circuit-breaker, an electronic tube for operating said relay, an input circuit for said tube coupled with the output of said comparator device so as to release said circuit-breaker in response to a reversing in the phase relation between the simultaneous values of said voltages, means in said input circuit for placing a bias on the grid of said tube adapted to prevent operation of said relay by said tube when no voltage drop is impressed across the filament-grid space of said tube by said input circuit, means, at said first mentioned end of said section, for supplying an auxiliary voltage in leading phase difference of 90° with the voltage at said end of the section, and means for connecting said auxiliary voltage supply means with said comparator device in response to the occurrence of a fault in said section during a breakdown of said distance transmission means.

8. In connection with an electric distribution system traversed by at least one alternating current and divided into sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection circuit-breaker at one end of said section, a relay for releasing said circuit-breaker, an electronic tube for operating said relay, an input circuit for said tube coupled with the output of said comparator device so as to release said circuit-breaker in response to a reversing in the phase relation between the simultaneous values of said voltages means in said input circuit for placing a bias on the grid of said tube adapted to prevent operation of said relay by said tube when no voltage drop is impressed across the filament-grid space of said tube by said input circuit, means, at said first mentioned end of said section, for supplying an auxiliary voltage in leading phase difference of 90° with the voltage at said end of the section, and two relays in series for connecting said auxiliary voltage supply means with said comparator device, one of said relays being operative in response to a failure of said transmission means and the other in response to the occurrence of a fault in said section of said system.

9. In connection with an electric distribution system traversed by at least one alternating current and divided into sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection circuit-breaker at one end of said section, means coupled with the output of said comparator device for releasing said circuit-breaker in response to a reversing in the phase relation between the simultaneous values of said voltages, means, at said first mentioned end of said section, for supplying an auxiliary voltage in leading phase difference of 90° with the voltage at said end of the section, means for connecting said auxiliary voltage supply means with said comparator device in response to the occurrence of a fault in said section during a breakdown of said distance transmission means, means for opposing the release of said circuit-breaker in case of absence of voltage across the output terminals of said comparator device, and signal means for indicating the absence of voltage drop across the output terminals of said comparator device.

10. In connection with an electric distribution system traversed by at least one alternating current and divided into sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection circuit-breaker at one end of said section, means coupled with the output of said comparator device for releasing said circuit-breaker in response to a reversing in the phase relation between the simultaneous values of said voltages, means, at said first mentioned end of said section, for supplying an auxiliary voltage in leading phase difference of 90° with the voltage at said end of the section, two relays in series for connecting said auxiliary voltage supply means with said comparator device, one of said relays being operative in response to a failure of said transmission means and the other in response to the occurrence of a fault in said section of said system, means for opposing the release of said circuit-breaker in case of absence of voltage across the output terminals of said comparator device, and signal means for indicating the absence of voltage drop across the output terminals of said comparator device.

11. In connection with an electric distribution system traversed by at least one alternating current and divided into sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection circuit-breaker at one end of said section, a relay for releasing said circuit-breaker, an electronic tube for operating said relay, an input circuit for said tube coupled with the output of said comparator device so as to release said circuit-breaker in response to a reversing in the phase relation between the simultaneous values of said voltages, means in said input circuit for placing a bias on the grid of said tube adapted to prevent operation of said relay by said tube when no voltage drop is impressed across the filament-grid space of said tube by said input circuit, a resistance in said input circuit, a signal device, and an electronic tube for operating said signal device having its filament-grid space connnected across said resistance, means, at said first mentioned end of said section, for suppling an auxiliary voltage in leading phase difference of 90° with the voltage at said end of the section, and means for connecting said auxiliary voltage supply means with said comparator device in response to the occurrence of a fault in said section during a breakdown of said distance transmission means.

12. In connection with an electric distribution system traversed by at least one alternating current and divided into sections, the combination of a comparator device located at one end of a section, means, including a coupling between said end of said section and said comparator device and distance transmission means between the other end of said section and said comparator device, for transmitting to the input of said comparator device the values of the voltage in said system taken simultaneously at the two ends of said section, respectively, a protection circuit-breaker at one end of said section, a relay for releasing said circuit-breaker, an electronic tube for operating said relay, an input circuit for said tube coupled with the output of said comparator device so as to release said circuit-breaker in response to a reversing in the phase relation between the simultaneous values of said voltages, means in said input circuit for placing a bias on the grid of said tube adapted to prevent operation of said relay by said tube when no voltage drop is impressed across the filament-grid space of said tube by said input circuit, a resistance in said input circuit, a signal device, and an electronic tube for operating said signal device having its filament-grid space connected across said resistance, means, at said first mentioned end of said section, for suppling an auxiliary voltage in leading phase difference of 90° with the voltage at said end of the section, and two relays in series for connecting said auxiliary voltage supply means with said comparator device, one of said relays being operative in response to a failure of said transmission means and the other in response to the occurrence of a fault in said section of said system.

13. In connection with an electric system traversed by at least one alternating current and divided into sections, the combination of a protection circuit-breaker at one end of said section, a phase comparator device at said end of said section having two inputs and one output, said output being connected with said circuit breaker and said comparator device being adapted to operate said circuit-breaker in response to the supply of electric factors in phase opposition to each other to the respective inputs of said device, means including a coupling between said end of said section and one input of said comparator device and distance transmission means between the other end of said section and the other input of said comparator device for transmitting from the respective ends of said section to the two respective ends of said device voltage values proportional to the values of an electric factor at said ends of said section, means at said first mentioned end of said section for suppling said comparator device with an auxiliary voltage in predetermined phase difference with the voltage at said first mentioned end of the section to place the respective inputs of said device in phase opposition to each other in response to the occurrence of a fault in said section, and means for bringing said auxiliary voltage supply means into action in response to the occurrence of a fault in said section during a period for which said distance transmission means are out of operation.

ANDRÉ CHEVALLIER.

REFERENCES CITED

The following references are of record in the file of this patent:

UNITED STATES PATENTS

| Number | Name | Date |
|---|---|---|
| 1,339,394 | Hunter | May 11, 1920 |
| 1,341,488 | Wedmore | May 25, 1920 |
| 1,646,265 | Steinmetz | Oct. 18, 1927 |
| 1,779,724 | Beard | Oct. 28, 1930 |
| 1,953,108 | Harder | Apr. 3, 1934 |
| 2,303,455 | Harder | Dec. 1, 1942 |
| 2,372,078 | Goldsborough | Mar. 20, 1945 |
| 2,381,527 | Traver | Aug. 7, 1945 |